United States Patent
Silvano

[19]

[11] Patent Number: 5,890,875
[45] Date of Patent: Apr. 6, 1999

[54] BLADE APPARATUS

[76] Inventor: David Silvano, 4041 NE. 12th Ave., Pompano Beach, Fla. 33064

[21] Appl. No.: 788,221

[22] Filed: Jan. 27, 1997

[51] Int. Cl.[6] .............................. B63H 1/26; B64C 11/16; F04D 29/38; B01F 7/32

[52] U.S. Cl. .................................. 416/227 R; 416/227 A; 29/428; 29/889.6; 29/889.7; 228/144; 228/173.6

[58] Field of Search ........................... 416/227 R, 227 A; 366/270, 343, 292, 325.6, 330.1; 29/889.3, 889.6, 889.7, 894.35, 894.351, 428; 228/144, 173.6; 440/49, 81

[56] References Cited

U.S. PATENT DOCUMENTS

| | | | |
|---|---|---|---|
| 1,023,699 | 4/1912 | Wilk | 440/81 |
| 4,293,279 | 10/1981 | Bolie | 416/227 A |
| 4,445,817 | 5/1984 | Wethern | 416/227 A |
| 4,472,063 | 9/1984 | Eickelmann | 366/343 |
| 5,169,055 | 12/1992 | Peterson et al. | 228/173.6 |
| 5,269,647 | 12/1993 | Moser | 416/227 R |
| 5,405,246 | 4/1995 | Goldberg | 416/227 A |
| 5,411,330 | 5/1995 | Arutyunov et al. | 416/227 R |

FOREIGN PATENT DOCUMENTS

| | | | |
|---|---|---|---|
| 18431 | 11/1889 | United Kingdom | 416/227 A |

*Primary Examiner*—Christopher Verdier
*Attorney, Agent, or Firm*—Law Practice of Scott L. Lambert, P.A.; Scott L. Lampert

[57] ABSTRACT

A three dimensional figure eight propeller/impeller blade apparatus is provided which may be used to propel a vehicle, power a shaft, create a vacuum, or move a medium. The blade apparatus is made from an elongated strip of generally flat material. In one embodiment, the ends of the flat strip of material are joined together to form two loops having an overall three dimensional figure eight configuration. In forming the loops, the upper and lower surfaces of the flat strip of material are continuously maintained relative to each other.

2 Claims, 5 Drawing Sheets

# BLADE APPARATUS

BACKGROUND OF THE INVENTION

1. Field of the Invention

This invention pertains in general to the field of propelling apparatus for generation of a thrust or for fluid flow, and in particular to the field of blade apparatus for powering a shaft, propelling a vehicle or for pumping a fluid, gas, liquid, or any other mixture, or any other medium.

2. Description of the Prior Art

Blades are used in various devices such as propellers, turbines, pumps, blowers, fans and other like apparatus. In general, such blades are twisted and angled to either propel a medium such as a liquid, gas or slurry past the blades or to cause a medium to impinge upon the blades to cause rotation of the blades about a shaft. For example, a boat propeller generally consists of two or more blades attached to a hub or shaft with the blades being twisted and raked backwards. The blades are symmetrically arranged around the circumference of the hub. The overall diameter, the amount of rake and the pitch of the blades all play a part in the performance of a propeller. Blades having a low pitch angle are generally more power producing than a blade having a high pitch angle. A higher pitch angle generally produces greater speed. Airplane propellers and fan blades are not unlike boat propellers, the only difference being that air is moved rather than water. The basic design of such blades has not changed for many years.

Pump impellers, on the other hand, come in many different designs. There are gear pumps, centrifugal pumps, turbine pumps and others. The only real difference between a pump impeller and a propeller is that one is designed to move a vehicle while the other is designed to move a medium. In actuality both devices move mediums. The boat itself moves because of the reaction of the propeller to the water as the water is being "pumped" past the propeller.

While there exist a number of inventions which are said to increase the performance of propellers and impellers, these inventions utilize the basic blade designs as explained above. Such inventions include changes to the rake and pitch angles, adding vanes to the blades, etc. But, the basic shape of the blade remains the same and the problems remain the same, i.e., the achievable rake and pitch are limited. Only the axial flow components serve to propel a vehicle, pump a medium or power a shaft. The transverse flow components are simply wasted energy.

Accordingly, there is still a need in the art for a propeller/impeller blade with improved rake and pitch, so that transverse energy is not diminished at the center or edges of the propeller/impeller blade(s). Any such device should allow for the use of a wide range of materials to accommodate different applications and decrease the cost. The present invention is particularly suited to overcome those problems which remain in the art in a manner not previously known.

Accordingly, a principal object of the present invention is to provide a propeller/impeller blade apparatus which has improved performance characteristics over the blades of conventional propellers, blowers, fans, pump impellers, etc.

Another object of the present invention is to provide propeller/impeller blade apparatus which can be used for pumping, turning a shaft and propelling applications.

Another object of the present invention is to provide a propeller/impeller blade apparatus which has improved performance characteristics over conventional blades as used in propelling, power conversion and pumping devices.

Another object of the present invention is to provide a pumping or thrust-producing blade which is of simple construction and therefore economical to manufacture.

SUMMARY OF THE INVENTION

The present invention comprises a three dimensional figure eight propeller/impeller blade apparatus which may be used to produce thrust to propel a vehicle such as a boat, to power a shaft, to create mechanical energy, or to pump a medium such as air, liquids, or slurries. The blade apparatus comprises a strip of flat material, which may be steel or any other suitable material, configured to form a non-planar blade. The resultant blade is affixed to the shaft of the desired structure, in perpendicular relation to the longitudinal axis of the shaft. In one embodiment, the flat strip of material is joined at the ends thereof such that two non-planar blades, which comprise oppositely extending "hoops" that extend radially from a hub are formed. The outside surfaces of one hoop are the inside surfaces of the other hoop, and vice-versa. When viewed from either the front or the side, the blades resemble a three dimensional figure eight. In this embodiment of the invention, the blade apparatus may be fashioned with a strip of material having a predetermined length, width and thickness to accomadate the particular application. With the strip in a flat horizontal position, one end is bent upward and brought toward the center of its length and the other end is bent downward and brought toward the center of the length of the strip. Both ends are moved to either the left or the right side of the strip and joined together. When joined, the top surface of one end is connected to the top surface of the other end. The bottom surfaces are also contiguous.

DESCRIPTION OF THE PREFERRED EMBODIMENTS

Figure 1:
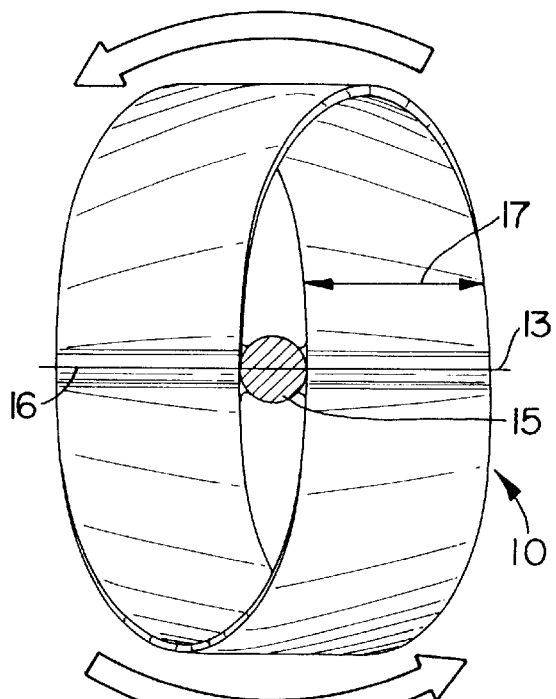
FIG. 1 is a front plan view of a configuration of the inventive blade, designed to rotate in a first direction.

As required, detailed embodiments of the present invention are disclosed herein. However, it is to be understood that the disclosed embodiments are merely exemplary of the invention, which may be embodied in various forms. Therefore, specific structural and functional details disclosed herein are not to be interpreted as limiting, but merely as a basis for expounding upon the claims and as a representative basis for teaching one skilled in the art to variously employ the present invention in virtually any appropriately detailed structure.

Reference is now made to the various figures of the drawings, wherein like characteristics and features of the present invention shown on the various figures are designated by the same reference numerals.

As shown in FIGS. 1–13, the present invention is directed towards a new and improved propeller/impeller blade which provides improved rake and pitch, so that transverse energy is not diminished at the center or edges of the propeller/impeller. FIGS. 1–4 show two blade arrangements which are made in accordance with the present invention. The blade embodiment 10 might be considered as having a left-handed pitch, while blade embodiment 20 might be considered as having a right-handed pitch, the pitch being relevant to the direction of rotation. Thus, if the blade embodiment 10 is used as a boat propeller, it would rotate counter-clockwise, as depicted in FIG. 1, when viewed from the rear of the boat. Conversely, the blade embodiment 20 would rotate clockwise when viewed from the same perspective, as shown in FIG. 3. The directions of rotation in blade embodiments 10 and 20 are defined by the flow of water through the blades 11 and 12, 21 and 22. In these embodiments, the blades, 11 and 12, 21 and 22 are configured as hoops extending from the hub or shaft 15 or 25.

Figure 2:
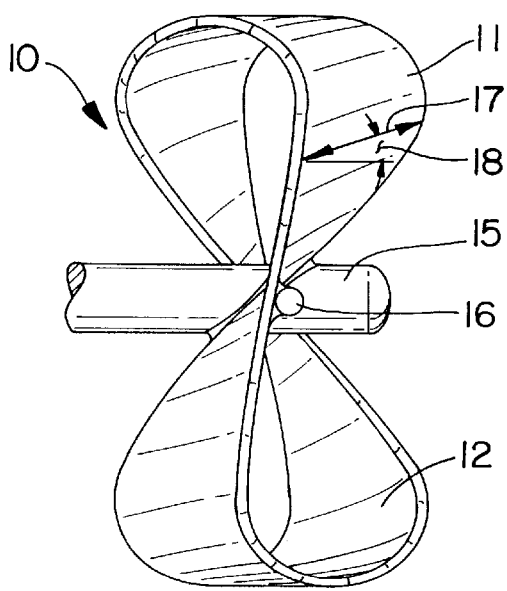
FIG. 2 is a left side view of the blade configuration of FIG. 1.
Figure 3:
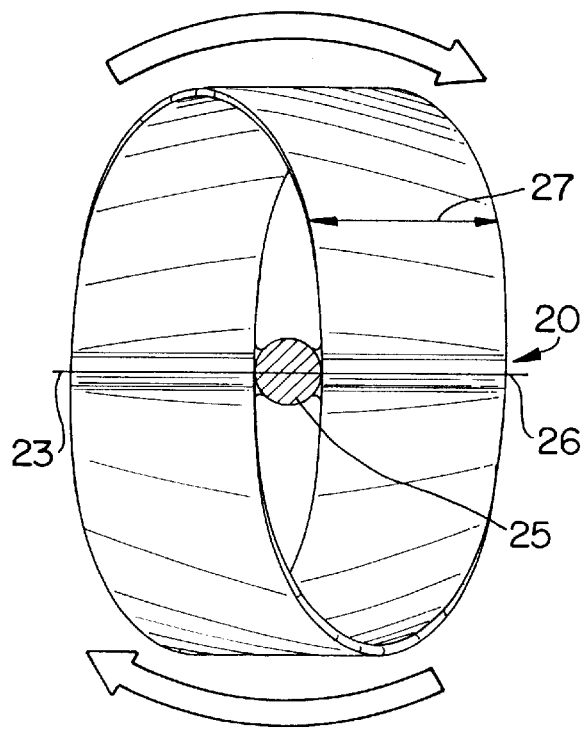
FIG. 3 is a front plan view of a configuration of the inventive blade designed to rotate in a direction opposite to that of FIG. 1.
Figure 4:
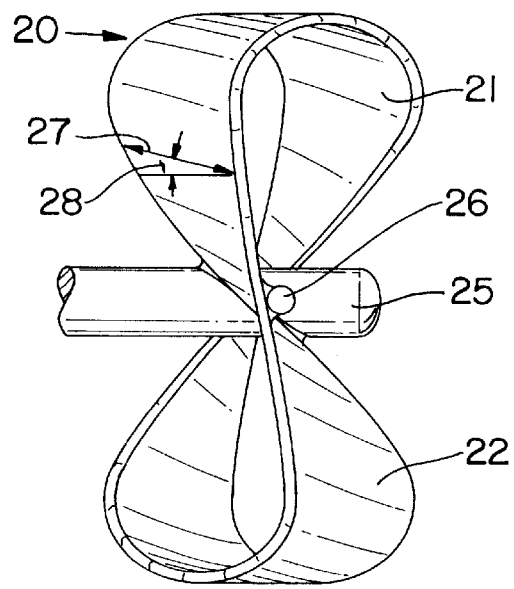
FIG. 4 is a left side view of the blade configuration of FIG. 3.

FIGS. 2 and 4 show a left side view of the blade embodiments 10 and 20. The hoops comprising the blades, 11 and 12, 21 and 22 are more clearly seen in these side views. In embodiments 10 and 20, each respective blade 11, and 12, 21 or 22 is symmetrical with its opposite counterpart. That is, that the length, height, thickness, width, curvature, twist, etc. are the same for each respective opposite blade, 11 and 12, 21 and 22. At the junction of each loop, the flat portion of each of the blades are generally coplanar 13, 23, thereby facilitating the mounting of the blades 11 and 12, 21 and to a hub or shaft 15 or 25, respectively. A bar or pin, 16, 26 may be fitted along the common line 13, 23 of the flat portions of the blades 11 and 12, 21 and 22 and welded to the shaft 15 or 25. Of course, alternative methods of attachment may be used, such as welding the edges of the blades to the shaft at the location of their joinder.

Through experimentation, the inventor herein has found that the performance of the various embodiments of the inventive blades are dependent upon a number of factors. One factor is the width 17 or 27 of the blade 11, 12, 21 or 22. Depending on the particular embodiment utilized, a wider width 17 or 27 tends to produce more torque while a narrower width 17 or 27 tends to produce more speed. Similarly, the height of the blades (in a radial direction from the hub) acts in the same manner as a conventional propeller having an increased outer diameter. Another factor effecting performance is the angle of twist 18 or 28 of the blades 11, 12, 21 or 22, which is a function of the diameter of hub or shaft 15 or 25 and the space between the blades. In embodiments 10 and 20, the angle of twist 18 or 28 may be changed by changing the space between the blade edges at the common line 13 or 23, which is the diameter of shaft 15 or 25. A larger spacing in embodiments 10 and 20 decreases the overall blade diameter and increases the angle of twist.

Figure 5:
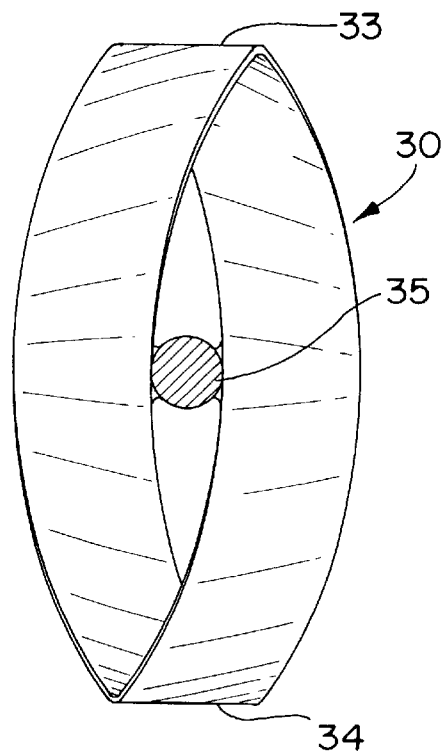
FIG. 5 is a front plan view of another embodiment of the inventive blade.
Figure 6:
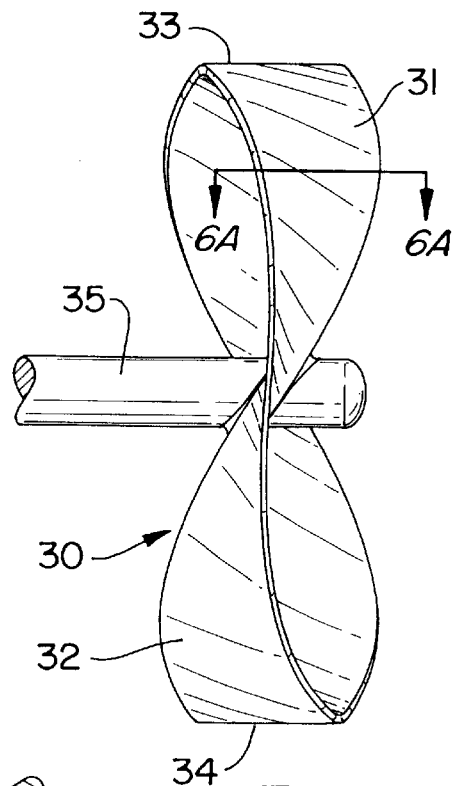
FIG. 6 is a left side view of the blade of FIG. 5.

FIG. 5 illustrates another blade embodiment 30 of the present invention. FIG. 6 illustrates a left side view of embodiment 30. Instead of the rounded, or curved, configuration of the outer diameter of the blade embodiments 10 and 20, the blade embodiment 30 provides for a more lineal convergence of the sides of each blade 31 and 32 in achieving a somewhat angled apex 33 and 34 at the blades' outer diameter. In order to understand this configuration, it is helpful to envision the distal ends of the loops formed by blades 11, 12, 21 and 22 of FIGS. 1 and 3 being pinched together to permanently form a crease 33 and 34 at the top end of each blade 31 and 32. The inventor has found that the embodiment 30, when used as a propeller, is advantageous because it results in a larger working surface area for a given size of the strip of material used to form the blade configuration. Either one or both of the outer ends of the loops comprising the figure eight configuration may be configured with such an angled apex.

Figure 7:
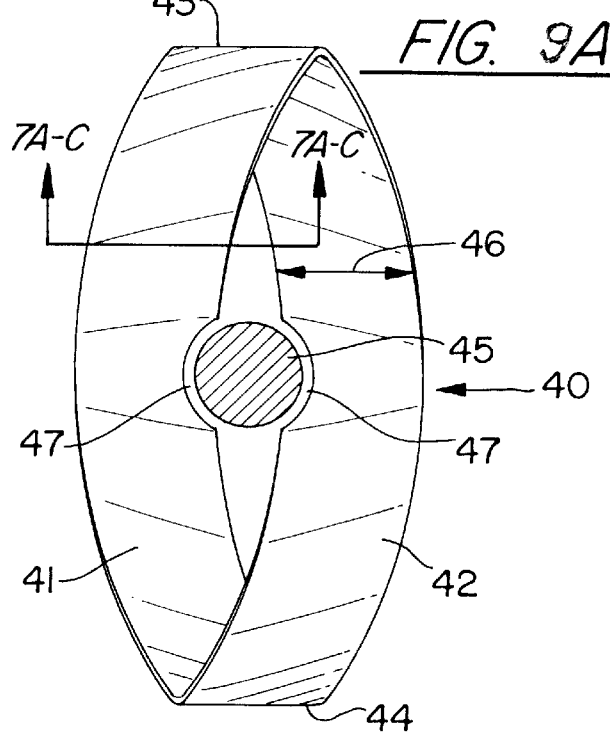
FIG. 7 is a front plan view of another embodiment of the blade adapted to fit a larger hub.
Figure 7A:
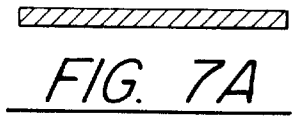
FIGS. 7A–7C are alternative cross-sectional configurations of the inventive blade taken along the line 7A-C—7A-C of FIG. 7.
Figure 7B:
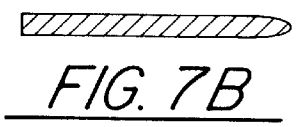
Figure 7C:
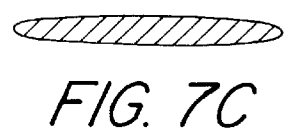

The embodiment 40 of FIG. 7 is a variation of the embodiment 30 of FIG. 5. This blade embodiment 40 includes the more sharply defined apex or crease 43 and 44 at the outer diameter of the blades 41 and 42 and incorporates blades of varying width 46. The width 46 of blades 41 and 42 are wider at the location of the shaft 45 than at the apex or crease 43 or 44. In this embodiment, a cut-out 47 at the junction in each of the blades may be used for purposes of securing the blade arrangement 40 to shaft 45. FIGS. 7A–7C illustrate some of the various cross-sectional shapes that the inventive blade may assume in practice. Other cross-sectional shapes may also be used.

Figure 9A:
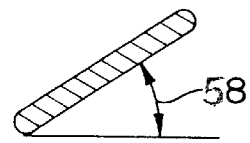
FIG. 9A is a cross-sectional view taken along the line 9A—9A of FIG. 9.
Figures 8, 9:
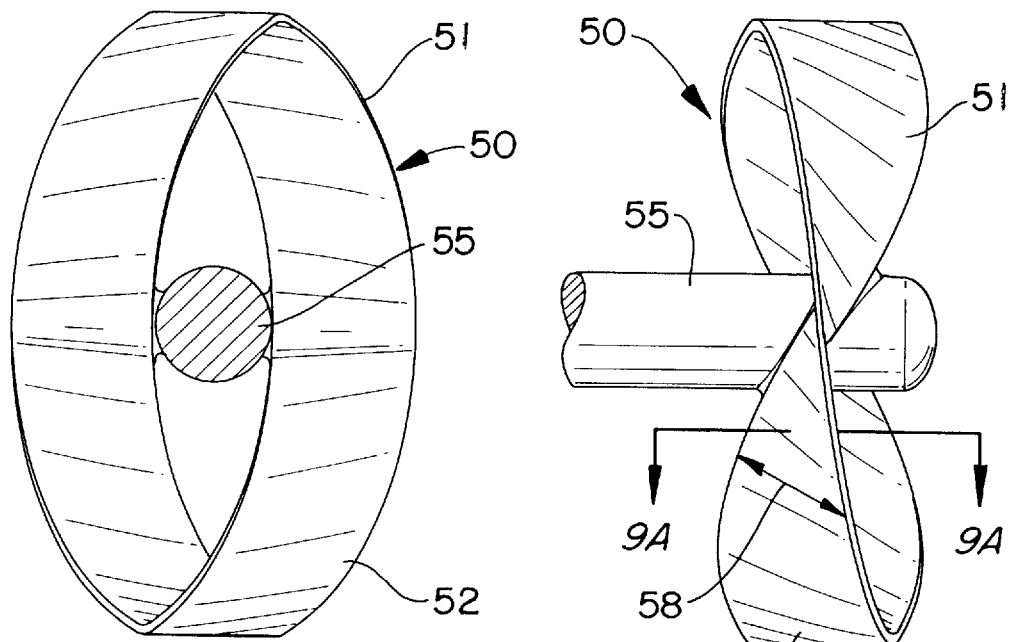
FIG. 8 is a left side view of the blade of FIG. 7.
FIG. 9 is a side view of another embodiment of the inventive blade.
Figure 6A:
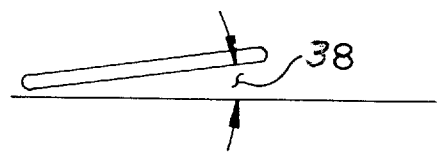

FIGS. 8 and 9 illustrate an embodiment 50, which is similar to the blade apparatus 30 of FIGS. 5 and 6, but has a larger space between the blades 51 and 52 at the location of the shaft 55. FIGS. 6A and 9A illustrate the change in blade twist angle 38 and 58 caused by the different spacings between the blades.

Figure 10:
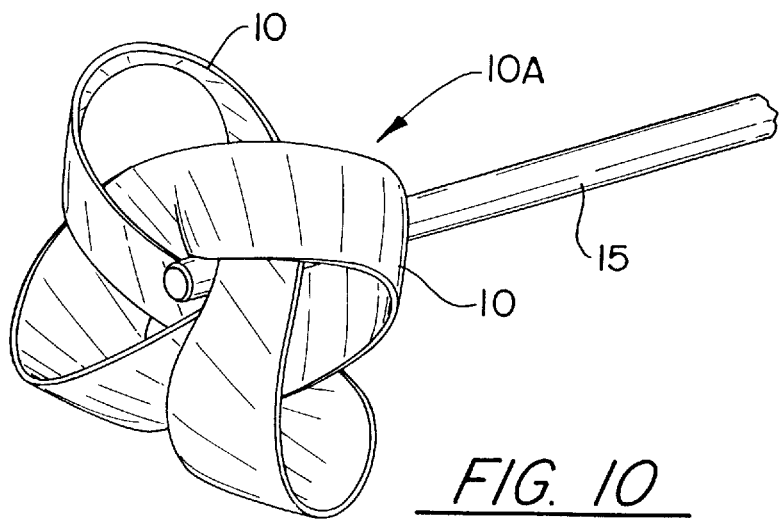
FIG. 10 is a perspective view of another embodiment of the inventive blades showing two three dimensional figure eights, comprising two flat strips, intertwined on a single shaft.

FIG. 10 illustrates a pair of the inventive blades 10A mounted symmetrically on a single shaft 15. In this embodiment, the inventive blades are oriented at a right angle to each other. Depending upon the particular application and the desired performance, three or conceivably more blades may be symmetrically positioned thereon the shaft 15 with the blades intertwined with each other.

Figure 11A:
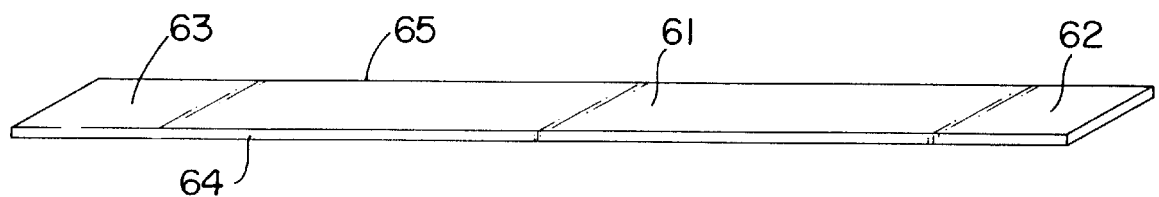
FIGS. 11A–11D illustrate a method of forming the inventive blade.
Figure 11B:
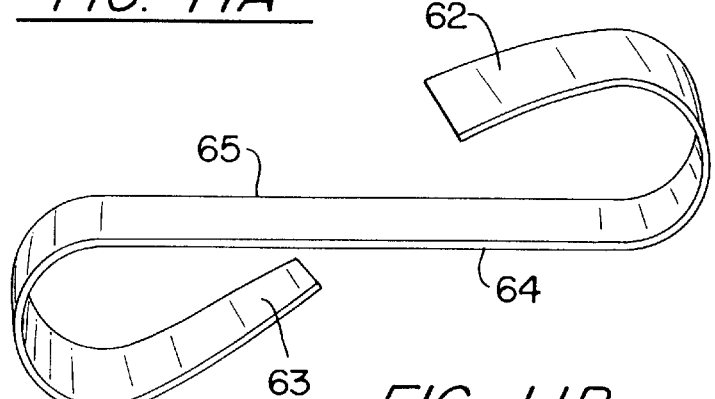
Figure 11C:
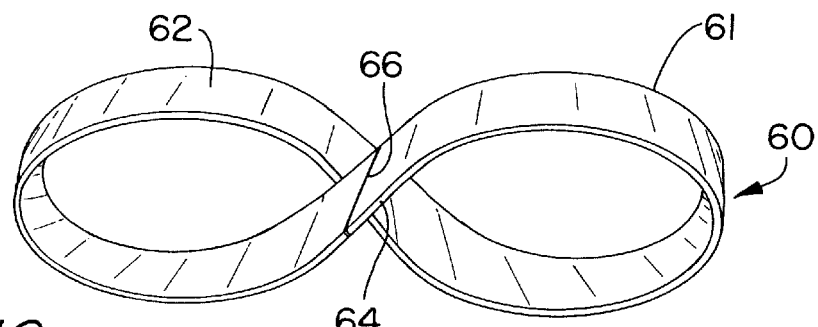
Figure 11D:
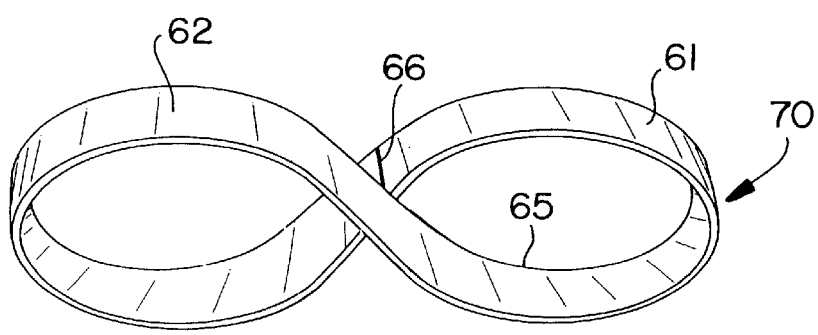

FIGS. 11A–14C illustrate a method of fabricating the various blade embodiments of the inventive blades. FIG. 11A depicts an elongated strip of material 61 such as steel, brass, bronze or any other suitable blade material. The thickness, length and width have been predetermined to achieve desired operating characteristics for a particular blade application. In FIG. 11B, a first end 62 is curved upward while a second end 63 is curved downward. The curvature of each end 62 and 63 continues while being moved to a longitudinal side edge 64 of the strip 61. When the ends 62 and 63 of the strip 61 contact each other 66, they are permanently joined such as by welding. The blade configuration 60 of FIG. 11C results. This blade apparatus 60 might be said to have a left-handed twist as per the blade apparatus of FIGS. 1 and 3. Should a right-handed twist be desired, while the blades are being curved as per FIG. 11B, the ends of the strip 62 and 63 are moved to edge 65 of the strip 61 and then joined together at junction 66. The blade configuration 70 of FIG. 11D results, which is comparable to that of FIGS. 2 and 4.

Figure 12:
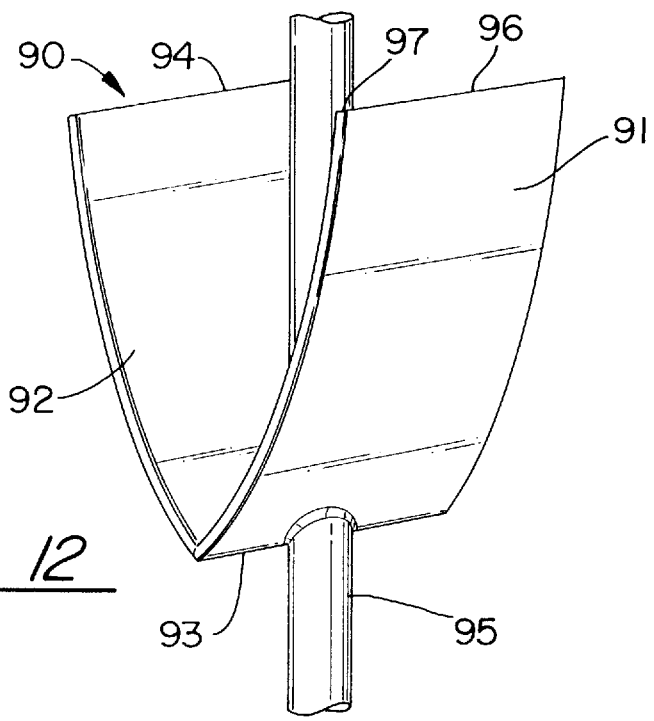
FIG. 12 is a perspective view of another embodiment of the inventive blade; and, FIG. 13 is a perspective view of still another embodiment of the inventive blade.

FIG. 12 illustrates yet another variation of the inventive blade. In embodiment 90, one outer half of the loops, such as the loops formed by blades 31 and 32 in FIGS. 5 and 6 are utilized. A creased end 93 is provided, but it is to be understood that end 93 may alternatively be rounded. A shaft 95 is shown to be positioned perpendicular to end 93. Shaft 95 may extend between blades 91 and 92 and up to and beyond ends 94 and 96. Ends 94 and 96 are arranged alone a common line forming said ends and for structural purposes may be joined at their junction 97. Due to the shape of the embodiment 90, the same may be used to create a vacuum.

Figure 13:
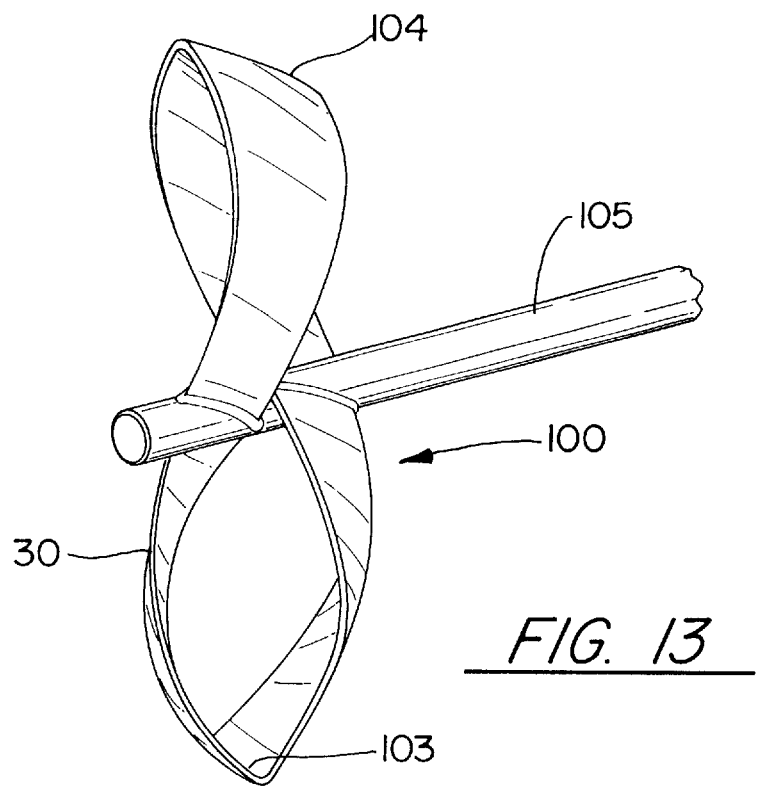

FIG. 13 illustrates an embodiment 100 having, for example, the blade 30 of FIG. 6 with the shaft 105 arranged 90° to the horizontal placement of the shaft 35 arrangement shown in FIG. 6. Creases 103 and 104 are used in this embodiment as shown; however, a rounded blade end configuration may also be utilized.

In accordance with the above description, it is seen that the inventive blades may be used in various different arrangements or embodiments to propel a vehicle, power a shaft, create a vacuum, or move or pump a medium, depending upon the application or use desired. The size, cross-sectional shape and angle of twist of any configuration is readily determined by simple prototype testing wherein the particular configuration chosen is used in the actual environment to be encountered.

An attribute of the invention is its ability to more efficiently direct flow of a medium past the blade in a direction consistent with the twist of the blade For example, when the inventive blade is used as a propeller, less radial flow, and consequently less wasted energy occurs than that of conventional propellers The axial flow advantage is also useful when the inventive blade is used as a pump impeller in line with flow through a conduit. Other advantages and usages will be apparent to one ordinarily skilled in the art.

While the invention has been described, disclosed, illustrated and shown in certain terms or certain embodiments or modifications, which it has assumed in practice, the scope of the invention is not intended to be limited, nor should it be deemed to be limited thereby, and such other modifications or embodiments as may be suggested by the teachings herein are particularly reserved, especially as they fall within the breadth and scope of the claims here appended, and in particular, as applied to any device or mechanism involving rotational motion.

I claim:

1. A propeller/impeller blade apparatus adapted to propel a vehicle or other device, create a vacuum, or move a medium comprising:

at least one elongated strip of a generally flat material having an upper surface, an opposite lower surface, a first end and an opposite second end, said first and second ends of each of said at least one elongated strip being joined together to form a first pair of contiguous loops having a first longitudinal axis and a first generally figure eight configuration about said first longitudinal axis, wherein said upper and lower surfaces of each of said at least one elongated strip are continuous with said upper and lower surfaces, respectively, of each adjoining said at least one elongated strip, thereby resulting in said upper and lower surfaces of said at least one elongated strip being continuous throughout said first figure eight configuration;

said blade apparatus being structured for attachment to a shaft in perpendicular relation to said first longitudinal axis; and at least one additional elongated strip of material configured to form a second pair of contiguous loops having a second longitudinal axis and a second generally figure eight configuration about said second longitudinal axis, said second pair of loops being positioned relative to said first pair of loops so that said first and second figure eight configurations are in perpendicular relation with one another and said first and second longitudinal axes are disposed within the same plane.

2. A method for manufacturing a propeller/impeller blade apparatus comprising the steps of:

turning a first end of an elongated strip of material in an upward direction, toward a lengthwise center of said strip of material;

turning a second end of said elongated strip of material in a downward direction toward said lengthwise center of said strip of material;

moving said first and second ends to a longitudinal side edge of said strip of material; and joining said first and second ends together.

* * * * *